United States Patent [19]

Rodgers

[11] E Patent Number: Re. 33,560

[45] **Reissued Date of Patent:* Mar. 26, 1991**

[54] MULTIPLE TELEPHONE JACK SLIDE ASSEMBLY

[75] Inventor: E. Walter Rodgers, 5650 W. Marconi, Glendale, Ariz. 85306

[73] Assignees: E. Walter Rodgers, Glendale; Lenual E. Rodgers, Jr., Phoenix, both of Ariz.

[ * ] Notice: The portion of the term of this patent subsequent to Apr. 14, 2004 has been disclaimed.

[21] Appl. No.: 447,387

[22] Filed: Dec. 7, 1989

Related U.S. Patent Documents

Reissue of:

[64] Patent No.: 4,712,232
Issued: Dec. 8, 1987
Appl. No.: 35,517
Filed: Apr. 7, 1987

U.S. Applications:

[63] Continuation-in-part of Ser. No. 839,740, Mar. 14, 1986, Pat. No. 4,658,418.

[51] Int. Cl.[5] ..... H05K 5/00

[52] U.S. Cl. ..... 379/329; 379/325; 379/328; 174/60

[58] Field of Search ..... 379/329, 325, 326, 327, 379/328, 330; 174/60; 439/49, 532

[56] References Cited

U.S. PATENT DOCUMENTS

| | | | |
|---|---|---|---|
| 3,182,805 | 5/1965 | Foster, Jr. et al. | 211/26 |
| 4,018,997 | 4/1977 | Hoover et al. | 179/98 |
| 4,053,719 | 10/1977 | Debortoli et al. | 179/98 |
| 4,217,023 | 8/1980 | Petit et al. | 339/121 |
| 4,326,107 | 4/1982 | Perna | 179/98 |
| 4,371,757 | 2/1983 | Debortoli et al. | 179/98 |
| 4,533,793 | 8/1985 | Geppert | 179/99 |
| 4,536,052 | 8/1985 | Baker et al. | 339/126 |
| 4,605,275 | 8/1986 | Pavel | 339/119 |
| 4,651,340 | 3/1987 | Marson | 379/156 |
| 4,658,418 | 4/1987 | Rodgers | 379/328 |
| 4,665,546 | 5/1987 | Brey et al. | 379/327 |
| 4,773,867 | 9/1988 | Keller et al. | 439/49 |

OTHER PUBLICATIONS

Anixter Borthers, Inc., Skokie, Ill., "Business Communications Products" Catalog, Outside Cover Bearing Year Date 1986, inside pages marked 1985, pp. 4, 7, and 73.

Graybar, Clayton, Missouri, Product Catalog No. 38, Bearing 1986 Copyright Notice, pp. 15-7, 15-8, and 15-20.

*Primary Examiner*—James L. Dwyer
*Attorney, Agent, or Firm*—Cahill, Sutton & Thomas

[57] ABSTRACT

A multiple telephone jack slide assembly includes a jack support member for supporting a multitude of telephone jacks upon an electronic wire connecting system. The jack support member has a longitudinal channel formed by a slotted opening for slidingly receiving telephone jacks, the side walls of the telephone jacks engaging edge portions of the slotted opening. One or more retaining members are secured to the jack support member to inhibit further sliding movement of the telephone jacks after the same are inserted in the channel through an opening communicating therewith.

20 Claims, 4 Drawing Sheets

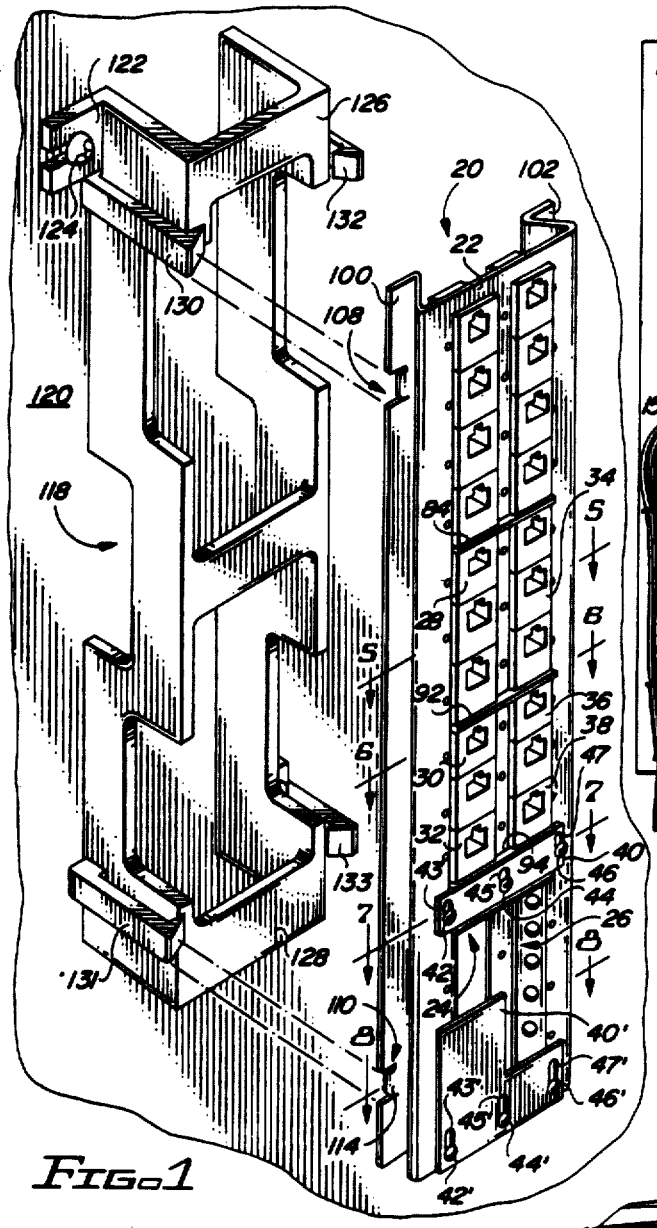
FIG. 1
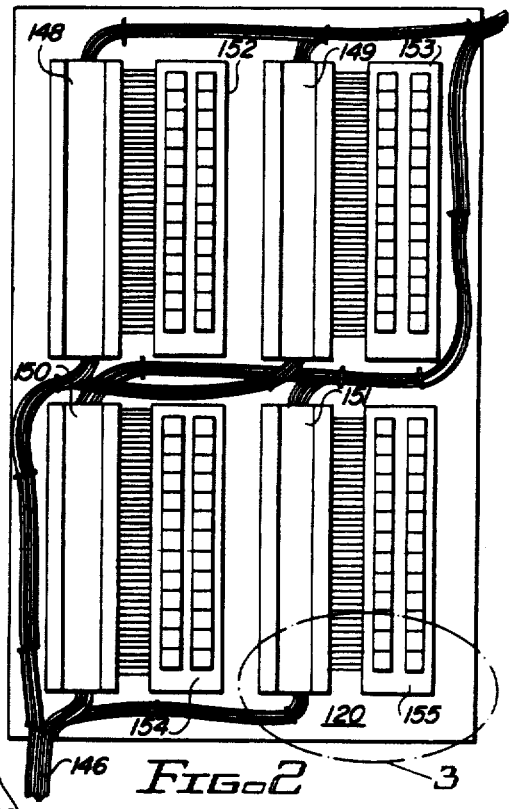
FIG. 2
FIG. 3
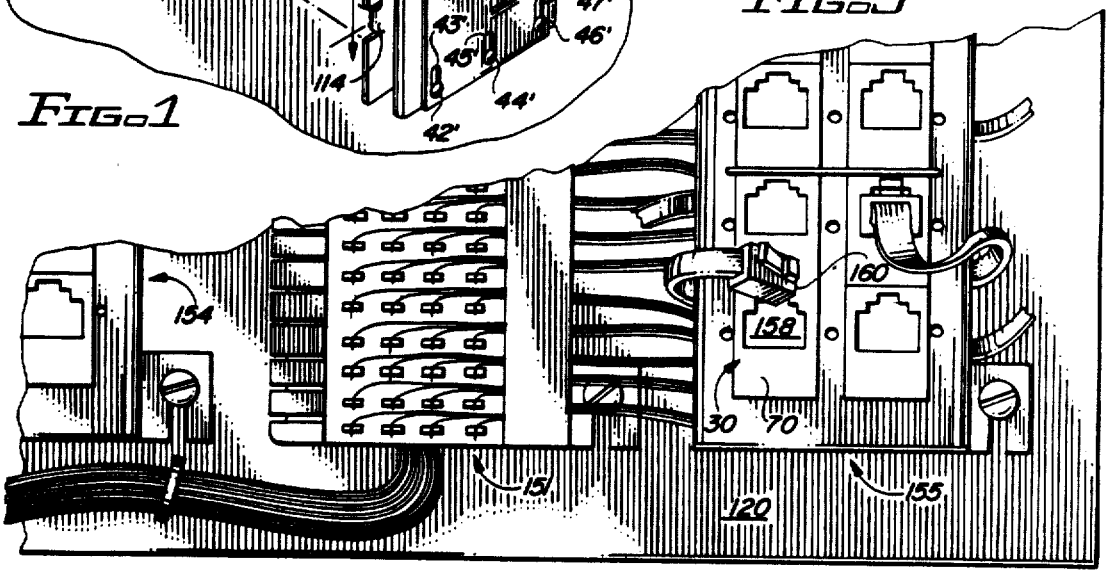

MULTIPLE TELEPHONE JACK SLIDE ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of copending U.S. patent application Ser. No. 06/839,740, filed on Mar. 14, 1986, now U.S. Pat. No. 4,658,418 and entitled "MULTIPLE TELEPHONE JACK SLIDE ASSEMBLY".

BACKGROUND OF THE INVENTION

1. Field of the Invention

The present invention relates generally to telephone wiring interchange equipment, and more particularly, to apparatus adapted to slidingly receive and support a plurality of telephone jacks upon a telephone wiring interchange panel.

2. Description of the Prior Art

Within businesses, orifices, apartment complexes and other locations where a number of telephone lines are clustered together telephone service is typically provided via a central telephone interchange wiring panel installed at the site of the business, office, apartment complex, etc. Often, an underground trunk cable is routed to the wiring panel, and the interconnection between the trunk cable and the individual telephone lines is made upon the wiring panel. Individual telephone line wires are routed from the wiring panel to each telephone in use at the site.

Presently, wiring interconnections are typically made upon the telephone interchange wiring panel through the use of so-called punch down blocks, also known as terminal boards. These devices, supplied by American Telephone & Telegraph Company and others, provide multiple rows of wire gripping terminals housed in a plastic base unit, the wire gripping terminals being adapted to releasably grasp and retain the stripped ends of telephone wires. Depending upon the specific model of the terminal board in use, all of the terminals within any given row may be shorted together by a common bus bar. Such terminal boards are either fastened directly to a back panel or are releasably supported by plastic mounting brackets secured to such a back panel.

Usually, four separate color-coded wires are routed to the terminal board from the main trunk line for each telephone line to be served at the site. The four separate wires are typically connected to four successive rows of terminals upon the terminal board. Another set of four color-coded wires is connected to the aforementioned four successive rows of terminals, and this second set of four wires is routed to a telephone at the site. Whenever new service is to be established for a new telephone line, odd service is to be disconnected for an existing telephone line, or a user assigned to a particular telephone line wants to relocate the telephone line to a different office or location at the site, a telephone service man must go to the wiring panel, locate the four rows of terminals assigned to the pertinent telephone line, and either connect, disconnect or move the four wires upon the terminal board corresponding to the effected telephone line.

In order to minimize the time required by the serviceman to make such wiring changes at the wiring panel, it has been proposed to provide a telephone jack and mating telephone plug for each telephone line serviced by the wiring panel. The advantage in implementing such a system is that telephone service can then be established or disconnected simply by inserting or removing the telephone plug from the related telephone jack. Similarly, service for a particular telephone line can be shifted to a different office or apartment simply by shifting a plug on the wiring panel from one telephone jack to another.

However, prior to the development of the present invention, there has been no convenient apparatus for supporting a large number of telephone jacks upon a telephone interchange wiring panel or other wire connecting system in a compact and inexpensive manner. Many thousands of such telephone interchange wiring panels already exist in the field, and any such apparatus for supporting a multitude of telephone jacks must necessarily be compatible and retrofit to existing wiring panels. Because such wiring panels are employed in great numbers, any such apparatus for supporting a multitude of telephone jacks should be inexpensive to manufacture and assemble in order to be practical from a commercial standpoint. In addition, because terminal boards vary in the number of telephone lines which can be handled by each such board, and because the number of telephone lines to be served varies from site to site, any such apparatus for supporting a multitude of telephone jacks upon a wiring panel should ideally be readily reconfigurable to provide a variety of differently numbered and variously spaced telephone jacks.

Accordingly, it is an object of the present invention to provide an apparatus for supporting a multitude of telephone jacks to be electrically interconnected with a wiring system which apparatus is compact and adapted to be mounted to and used in conjunction with a variety of wiring systems.

It is another object of the present invention to provide such an apparatus which is relatively inexpensive to manufacture and assemble.

It is yet another object of the present invention to provide such an apparatus which does not require any modification of conventional telephone jacks already commercially available.

It is a further object of the present invention to provide such an apparatus in which it is a simple matter to vary the number of telephone jacks supported by such an apparatus.

It is another object of the present invention to provide such an apparatus which is easily modified to accommodate various different styles of telephone jacks.

These and other objects of the present invention will become more apparent to those skilled in the art as the description thereof proceeds.

SUMMARY OF THE INVENTION

Briefly described, and in accordance with one embodiment thereof, the present invention provides a multiple telephone jack slide assembly for supporting a multitude of telephone jacks upon an electrical wiring system, the assembly including a support member having a channel formed therein, the channel being bounded by first and second opposing edge portions of the support member. The first and second edge portions are separated by a predetermined distance corresponding to the width of the channel. An opening communicates with the channel for permitting telephone jacks to be inserted into the channel. Fastening means are provided for fastening the support member to a conventional telephone interchange wiring panel, wire connecting block, wiring cabinet frame, or other wiring system components. The assembly further includes a plurality of telephone jacks of the type designed to releasably receive a mating telephone cord plug. Such telephone jacks have a width approximating the width of the channel in the support member. The side walls of the telephone jacks slidingly engage the opposing edge portions of the channel formed in the support member for permitting each of the telephone jacks to be slid into the channel from the opening communicating therewith. After the appropriate number of telephone jacks are inserted within the channel, a retaining member is releasably fastened to the support member and abuts at least one of the telephone jacks for preventing any further sliding movement of the telephone jacks slidingly received within the channel.

In one embodiment of the present invention, the support member includes a generally planar elongated surface having a slotted opening formed therein in order to provide a longitudinal channel. Each of the telephone jacks has grooves formed in the side walls thereof which grooves are of a width commensurate with the thickness of the generally planar elongated surface of the support member. The width of the telephone jacks slightly exceeds the width of the channel formed in the support member. The grooves formed in the side walls of the telephone jack are designed to slidingly receive the opposing edge portions of the support member bounding the slotted opening for allowing each of the telephone jacks to be slid into the channel and supported by the support member.

In another embodiment of the present invention, the plurality of telephone jacks each have opposing side walls wherein each side wall has first and second projections, extending therefrom and spaced apart from each other by a predetermined gap. The first and second edge portions of the support member have a face width commensurate with the predetermined gap and slidingly engage the first and second projections extending from each side wall.

In yet another embodiment of the present invention, the plurality of telephone jacks each have a first side wall with a first engagement path and a second side wall with a second engagement path, wherein the first and second engagement paths are offset from one another relative to the upper surface of the telephone jack. The first and second opposing edge portions of the support member are laterally offset from one another by a like amount for permitting the first and second opposing edge portions to slidingly engage the first and second engagement paths.

In still another embodiment of the present invention, the slide assembly includes an enclosure member releasably fastened to the support member for enclosing the connecting wires extending from the plurality of telephone jacks. The enclosure member preferably includes at least one panel extending generally perpendicular to the planar elongated surface of the support member in which the channel is formed, proximate to the opening of the channel, for preventing telephone jacks within the channel from sliding into the opening.

BRIEF DESCRIPTION OF THE DRAWINGS

FIG. 1 is a perspective view of a multiple telephone jack slide assembly constructed in accordance with one embodiment of the present invention and adapted to be supported by a terminal board mounting bracket also illustrated within FIG. 1.

FIG. 2 is a top view of a telephone interchange wiring panel including both conventional punch down terminal boards and the novel multiple telephone jack slide assembly corresponding lg 1 to the present invention.

FIG. 3 is an enlarged view of the portion of FIG. 2 encircled by dashed oval 3.

DETAILED DESCRIPTION OF THE PREFERRED EMBODIMENTS

Figure 4:
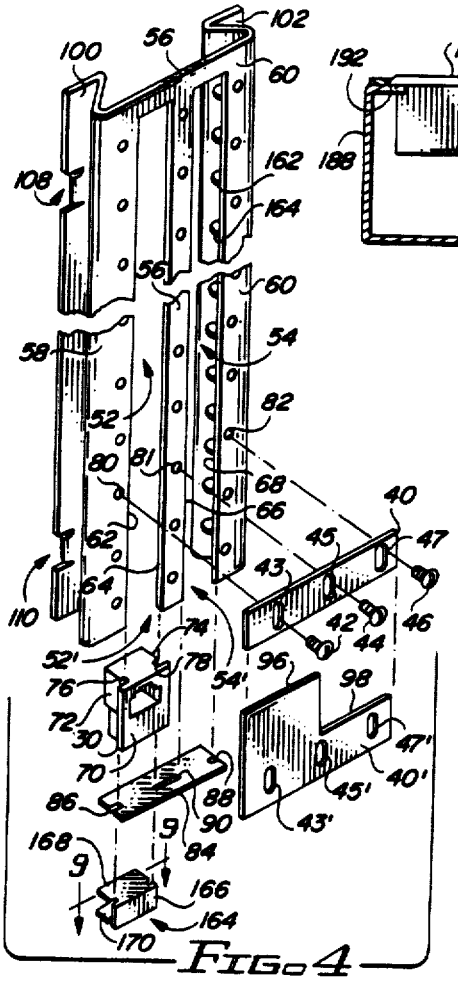
FIG. 4 is an exploded perspective view of the multiple telephone jack slide assembly shown in FIG. 1.

With reference to FIG. 1, a multiple telephone jack slide assembly is designated generally by reference numeral 20 and includes a sliding jack support member 22. Formed within support member 22 are first and second longitudinal channels 24 and 26 adapted to slidingly receive a first plurality of telephone jacks including those designated by reference numerals 28, 30 and 32, and a second plurality of telephone jacks including those designated by reference numerals 34, 36 and 38, respectively. Also shown in FIG. 1 is a retaining member 40 which extends across and generally perpendicular to channels 24 and 26. Screws 42, 44 and 46 extend through slotted apertures 43, 45 and 47, respectively formed within retaining member 40 for securing retaining member 40 in a selected position along support member 22. As shown in FIG. 1, support member 40 generally abuts the lower edges of telephone jacks 32 and 38 for inhibiting further sliding movement of the inserted telephone jacks within channels 24 and 26. An alternate form of retaining member is shown within FIG. 1 and is designated by reference numeral 40'. Features of retaining member 40' which correspond to those described with regard to retaining member 40 have been identified with correspondingly primed reference numerals.

For purposes of clarifying the construction and assembly of the multiple telephone jack slide assembly shown in FIG. 1, an exploded view thereof is shown in FIG. 4. As shown, support member 22 includes a raised generally planar elongated surface 50 in which a first slotted opening 52 is formed having an open end 52'. A second slotted opening 54 having an open end 54' is also formed within generally planar elongated surface 50 parallel and adjacent to slotted opening 52 A. resulting finger portion 56 of generally planar elongated surface 50 serves to divide slotted openings 52 and 54 from one another. Slotted openings 52 and 54 provide the first and second elongated channels 24 and 26, respectively, described with respect to FIG. 1 above. The width of slotted openings 52 and 54 are equal to one another, as they serve substantially the same purpose. Slotted opening 52 is bounded by finger portion 56 and a first side portion 58 of elongated surface 50, while slotted opening 54 is bounded by finger portion 56 and a second opposing side portion 60 of elongated surface 50.

Figure 5:
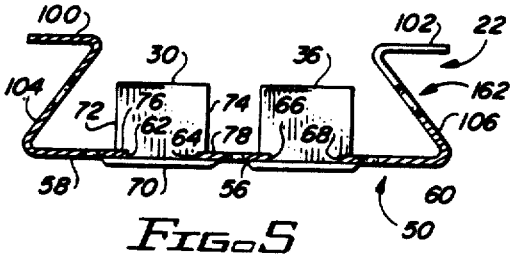
FIGS. 5, 6, 7 and 8 are cross-sectional views of the multiple telephone jack slide assembly taken through the lines designated 5—5, 6—6, 7—7, and 8—8, respectively, as shown in FIG. 1.
Figure 7:
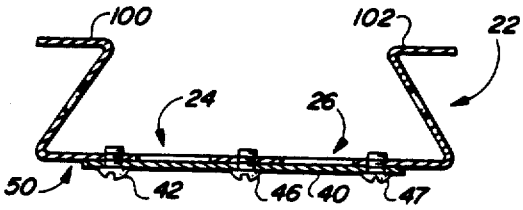
Figure 6:
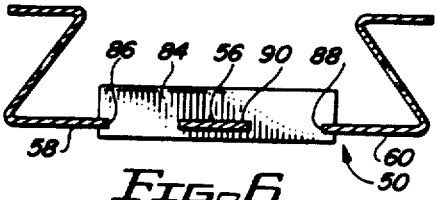

Referring to FIGS. 4 and 5, slotted opening 52 is defined by opposing edge portions 62 and 64 of jack support 22. Similarly, slotted opening 54 is bordered by opposing edge portions 66 and 68 of support member 22. As shown in FIG. 4, telephone jack 30 is adapted to be slid between opposing edge portions 62 and 64 of jack support 22 for being supported by longitudinal channel 24 corresponding to slotted opening 52. As shown in FIGS. 4 and 5, telephone jack 30 includes an upper surface 70 and a pair of opposing side walls 72 and 74 which extend downwardly therefrom, substantially perpendicular thereto. Opposing side walls 72 and 74 are separated from one another by a distance approximating the width of slotted opening 52. In the preferred embodiment of the present invention, side walls 72 and 74 of telephone jack 30 are separated by a distance slightly in excess of the width of slotted opening 52. A groove 76 is provided within the side wall 72 of telephone jack 30 just below upper surface 70. A similar groove 78 is provided within side wall 74 of telephone jack 30. The thickness of elongated surface 50 of support member 22 is selected to be commensurate with the width of grooves 76 and 78 formed within telephone jack 30. Accordingly, grooves 76 and 78 slidingly engage opposing edge portions 62 and 64 of longitudinal channel 24 for permitting telephone jack 30 to be slid into the channel from open end 52'. As shown in FIG. 1, a multitude of such telephone jacks can be slid into longitudinal channel 24 prior to locking such telephone jacks in place against further sliding movement by retaining member 40.

Referring to FIG. 4, a series of regularly spaced threaded holes, such as those designated by reference numerals 80, 81 and 82 are formed along elongated surface 50 on finger portion 56 and opposing side portion 58 and 60. Threaded holes 80, 81 and 82 are engaged by screws 42, 44 and 46, respectively, in order to secure retaining member 40 across longitudinal channesl 24 and 26. Slotted apertures 43, 45 47 permit retaining member 40 to be laterally shifted prior to tightening screws 42–46 in order to permit retaining member 40 to abut the endmost telephone jacks and thereby inhibit further sliding movement of the telephone jacks supported by support member 22. Moreover, retaining member 40 further serves to stiffen finger portion 56 against deflection out of the plane in which elongated surface 50 lies.

In order to further stiffen finger portion 56 against deflection, stiffening members, such as that designated by reference numeral 84 within FIG. 4, can be periodically slid onto jack support 22 between groupings of telephone jacks. Stiffening member 84 has a length slightly in excess of the distance between edge portion 62 and edge portion 68 of elongated surface 50. Grooves 86 and 88 are formed within opposing side walls of stiffening member 84 for slidingly engaging edge portions 62 and 68. In addition, a further groove in the form of a rectangularly shaped aperture 90 is formed within the central portion of stiffening member 84 for permitting finger portion 56 to be advanced therethrough. Referring briefly to FIG. 1, such stiffening members are designated by reference numerals 84, 92 and 94.

As mentioned above, retaining member 40' shown in FIGS. 1 and 4 designates an alternate form of retaining member which is particularly useful when longitudinal channel 24 has one less telephone jack within it than longitudinal channel 26. Retaining member 40' includes a first abutment 96 and a second abutment 98 offset therefrom by a distance corresponding to the length of one telephone jack. In this manner, abutment edges 96 and 98 may simultaneously abut the endmost telephone jacks within longitudinal channels 24 and 26 and inhibit sliding movement of the telephone jacks installed within each of such channels.

With reference to FIGS. 1 and 5, jack support member 22 includes a pair of lower supporting flanges 100 and 102 which extend generally parallel to and commensurate with elongated surface 50. A pair of sloped slide members 104 and 106 extend upwardly from lower support flanges 100 and 102 respectively, and are coupled to side portions 58 and 60, respectively, for raising elongated surface 50 above the plane in which lower support flange 100 and 102 lie. Elongated surface 50 is spaced apart from lower support flanges 100 and 102 by at least the depth of the telephone jacks in order to avoid interference with the sliding movement of the telephone jacks within their supporting channels.

Figure 8:
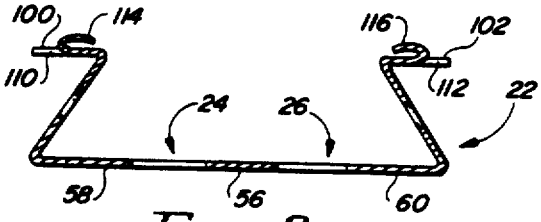

Lower flanges 100 and 102 of support member 22 may be fastened to a telephone interchange wiring panel by different methods. In one embodiment of the present invention, rectangular cutouts or notches 108 and 110 are formed adjacent the opposing ends of lower support flange 100. Corresponding rectangular cutouts are formed on lower support flange 102, including rectangular cutout 112 shown in FIG. 8. Such rectangular cutouts are preferably formed by doubling over the material removed from the cutout portion to form bent ears, such as those shown in FIG. 8 as designated by reference numerals 114 and 116. Referring to FIG. 1, a plastic mounting bracket 118 is shown of the type commonly used to secure punch down terminal boards to back panel 120. An example of such a plastic mounting bracket is that commercially available from American Telephone & Telegraph Company (formerly Western Electric) under the model designation 89B. Mounting bracket 118 includes lower support flanges, such as that identified by reference numeral 122 adapted to be fastened against wiring panel 120, as by a screw 124. Plastic mounting bracket 118 includes raised support surfaces 126 and 128, and further includes a set of four spring-biased latch fingers 130, 131, 132 and 133. The uppermost, inwardly projecting ends of latch fingers 130–133 extend just above support surfaces 126 and 128 and are designed to grasp the base portion of a punch down terminal board for retaining the same against support surfaces 126 and 128. Accordingly, the spacing between rectangular cutouts 108 and 110 formed in lower support flange 100 of support member 22 is made to correspond to the distance between latch fingers 130 and 131. Similarly, the distance between ears 114 and 116 (see FIG. 8) is made to correspond to the distance between latch fingers 131 and 133, thereby allowing latch fingers 131 and 133 to releasably grasp ears 114 and 116, maintaining the doubled over lower portions thereof against support surface 128. By doubling over ears 114 and 116, a generally rounded surface is provided for more easily spreading latch fingers 131 and 133 when support member 22 is fastened to mounting bracket 118.

Figure 14:
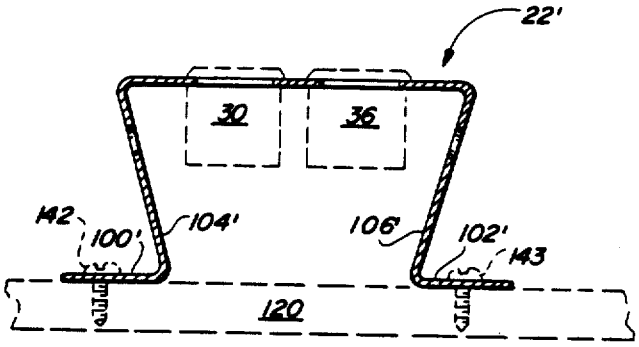
FIG. 14 is a cross-sectional view of the assembly shown in FIG. 13 as taken through lines 14—14.
Figure 13:
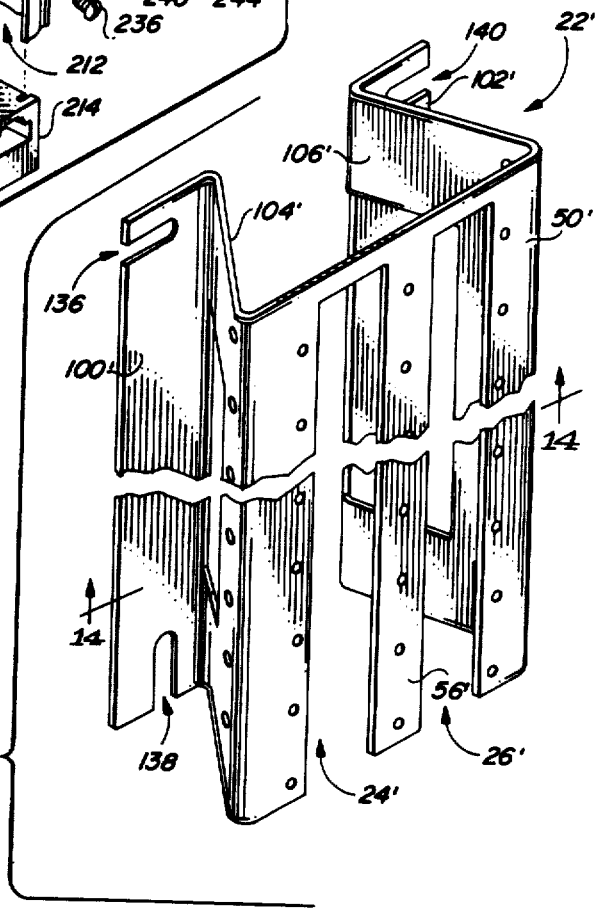
FIG. 13 is a partial perspective view of an alternate embodiment of the multiple telephone jack slide assembly shown in FIG. 1.

Referring briefly to FIGS. 13 and 14, an alternate embodiment of the present invention is illustrated wherein the lower support flanges 100' and 102' are adapted to be directly fastened to wiring panel 120. Within FIGS. 13 and 14, those features of the jack support member which generally correspond to those previously described with reference to FIGS. 1, 4 and 5 have been designated by correspondingly primed reference numerals. As shown in FIG. 13, slotted apertures 136 and 138 are formed at opposing ends of lower support flange 100'; similar slotted apertures, including aperture 140 are formed at opposing ends of lower support flange 102'. The distance measured diagonally from slotted aperture 138 to slotted aperture 140 is made to correspond to the distance between corresponding apertures formed within the support flanges 22 of plastic mounting bracket 118 (see FIG. 1). In this manner, screws, such as those designated in FIG. 14 by reference numerals 142 and 143 may be used to directly fasten the lower support flanges 100' and 102' of support member 22' to wiring panel 120. Side walls 104' and 0640 ' for the embodiment shown in FIGS. 13 and 14 are substantially taller than corresponding side walls 04 and 106 for the embodiment shown in FIGS. 4 and in order to space telephone jacks 30 and 36 a sufficient distance above wiring panel 120 to permit the routing of telephone wires between wiring panel 120 and telephone jacks 30 and 36.

FIGS. 2 and 3 best illustrate the manner in which multiple telephone jack slide assemblies of the type described with respect to FIGS. 1–8 and 13–14 are used in conjunction with a conventional telephone interchange wiring panel. Within FIG. 2, the bundled cable 146 represents a bundle of telephone wires originating from an underground trunk line operated by the telephone company. Four punch down terminal boards 148, 149, 150 and 151 are shown as mounted to wiring panel 148, each receiving a portion of the telephone wires which collectively make bundle 146. A multiple telephone jack slide assembly of the type provided by the present invention is associated with each of the punch down terminal boards. Thus, multiple telephone jack slide assemblies 152, 153, 154 and 155 are also mounted to wiring panel 120 adjacent one of the aforementioned punch down terminal boards. As shown in FIG. 2, bundles of outgoing wires leave the upper end of each of the punch down terminal boards and collectively form bundle 156 for routing to individual telephones at the business, office, apartment complex, etc. being served.

As shown in the enlarged drawing of FIG. 3, the upper surface of telephone jack 30 opens into a cavity 158 adapted to releasably receive a mating telephone cord plug 160. Typically, the number of such mating telephone cord plugs provided is equal to the number of telephone jacks supported upon assembly 155. Each telephone jack, including telephone jack 30, is coupled by color-coded wires to various rows of terminals provided by punch down terminal board 151. Similarly, each of the mating telephone plugs, including plug 160, is coupled by color-coded wires to associated rows of terminals provided by punch down terminal board 151. It should be clear to those skilled in the art that a particular telephone line can be connected or disconnected simply by inserting or removing plug 160 from jack 30. It will be further appreciated that, by moving plug 160 from socket 30 to a different socket, telephone service for a particular user can be moved to a different office or apartment. Referring briefly to FIGS. 4 and 5, it will be noted that enlarged holes, such as those designated by reference numerals 162 and 164 may be formed in side walls 104 and 106 to facilitate the passage therethrough of the wires secured to each of the telephone plugs.

Figure 9:
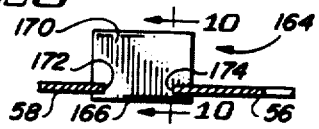
FIGS. 9 and 10 are cross-sectional views of a spacer member shown in FIG. 4 taken through lines 9—9 and 10—10, respectively.
Figure 10:
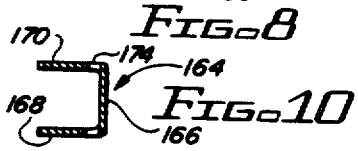

In some instances, it may be preferred to increase the amount of spacing between successive telephone jacks, for example, to match the spacing of associated terminals on the adjacent punch down terminal board. In such instances, a spacing member may be inserted within the channels of the jack support member between successive telephone jacks in order to increase the spacing therebetween. Referring to FIGS. 4, 9 and 10, spacing member 164 is U-shaped and includes an upper wall 166 and opposing front and back walls 168 and 170. As shown in FIG. 9, grooves 172 and 174 are formed within back wall 170 immediately below upper wall 166, grooves 172 and 174 permitting back wall 170 to slide between the opposing edge portion 62 and 64 of channel 24. Similar grooves are formed within front wall 168 in order to permit spacing member 164 to be slidingly received within channel 24.

Figure 12:
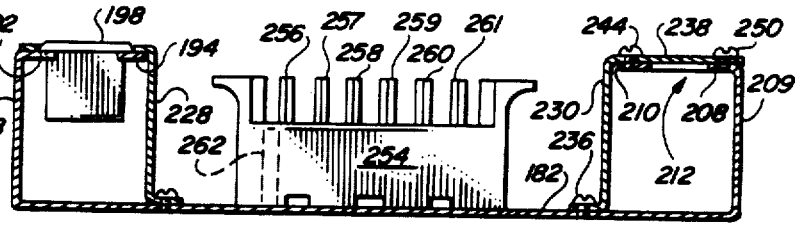
FIG. 12 is a cross-sectional view of the multiple telephone jack slide assembly shown in FIG. 11 taken through lines 12—12 and further illustrating the punch down terminal board positioned upon the base.
Figure 11:
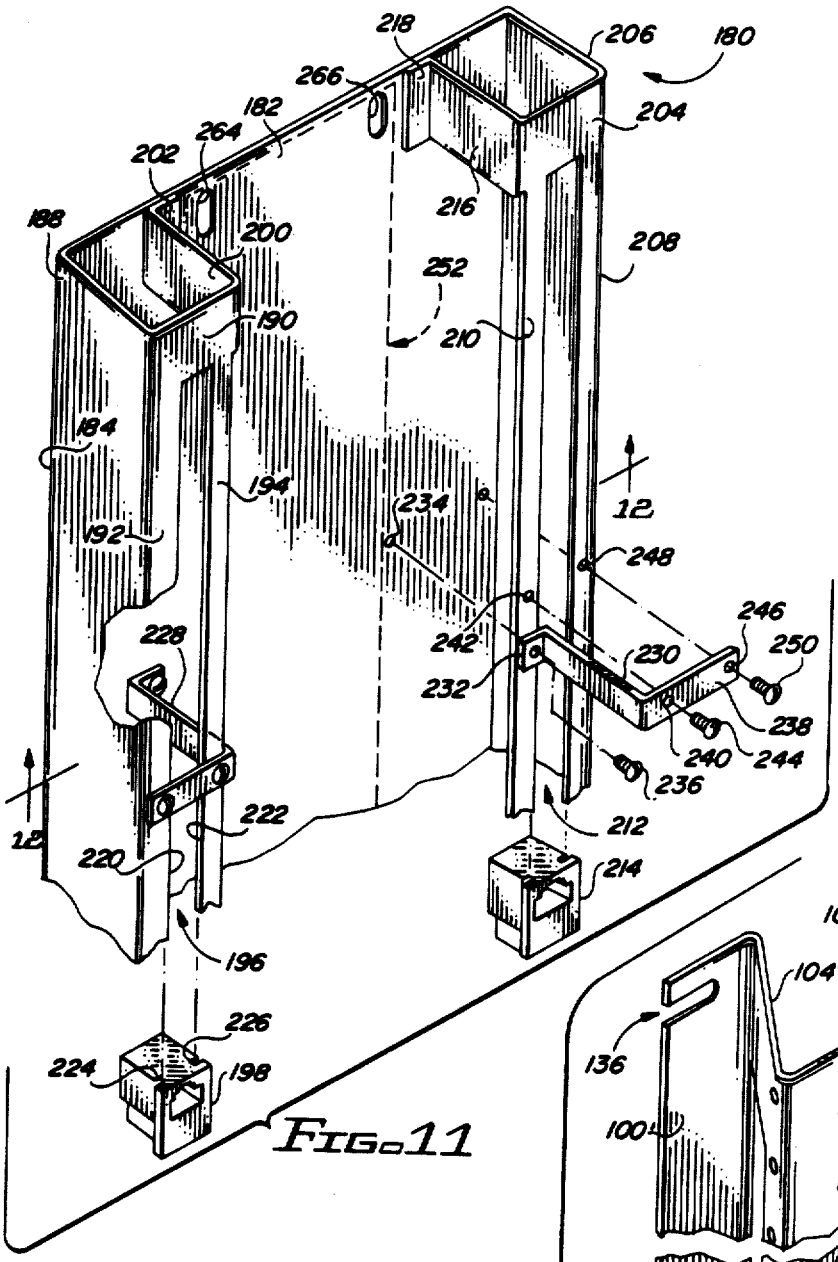
FIG. 11 and is a partial perspective view of an alternate embodiment of the present invention wherein two telephone jack receiving channels are disposed along opposing sides of a base adapted to support a punch down terminal board between such channels.

FIGS. 11 and 12 illustrate an alternate embodiment of the present invention wherein the multiple telephone jack slide assembly is configured to provide a jack supporting channel along both sides of a centrally mounted punch down terminal board. Within FIG. 11, the multiple telephone jack slide assembly is desginated generally by reference numeral 180 and includes a generally planar rectangular base 182 having a first side edge 184 and an opposing second side edge 186. A first side wall 188 extends upwardly from side edge 184 of base 182, substantially perpendicular to base 182. A first generally planar elongated surface 190 includes a first side portion 192 coupled to and supported by side wall 188 for supporting elongated surface 190 at a position spaced apart from and generally parallel to base 182. Surface 190 includes a second side 194 opposite first side 192 and generally separated therefrom by an open ended slotted opening 196 forming a longitudinal channel for receiving and supporting a plurality of telephone jacks, such as telephone jack 198. An interconnecting wall 200 extends from the upper end of side portion 194 of elongated surface 190 back toward base 182 and terminates in a flange 202 extending parallel to and overlying base 182. Flange 202 is welded or otherwise fastened to base 182 to aid in supporting elongated surface 190.

Similarly, a second generally planar elongated surface 204 is supported above and along the opposite side of base 182 by a second side wall 206 extending substantially perpendicular from side edge 186 of base 182. Generally planar elongated surface 204 includes a first side 208 adjacent side wall 206 and a second side 210 opposite thereto and generally divided therefrom by a second slotted opening 212. Slotted opening 212 forms a similar longitudinal channel within elongated surface 204 for receiving and supporting a second plurality of telephone jacks, such as telephone jack 214. A short interconnecting wall 216 extends from the upper end of second side 210 back toward base 182 and terminates in a supporting flange 218 fastened to base 182.

As in the previously described embodiments, slotted openings 196 and 212 each provide first and second opposing edge portions for being slidingly received within the grooves of the associated telephone jacks supported thereby. Within FIG. 11, slotted opening 196 is bounded by opposing edge portions 220 and 222 which are engaged, respectively, by grooves 224 and 226 of telephone jack 198.

In order to facilitate wiring interconnections to the first and second pluralities of telephone jacks supported within slotted openings 196 and 212, interconnecting walls 200 and 216 do not extend the entire length of base 182. Accordingly, additional means for supporting second side 194 of elongated surface 190, and for supporting second side 210 of elongated surface 204, is required in order to minimize the deflection of side portions 194 and 210 out of the plane normally containing elongated surfaces 190 and 204. For this purpose, one or more supporting legs, such as those designated by reference numerals 228 and 230, are provided for maintaining side portions 194 and 210 spaced apart from base 182 by the same amount as side portions 192 and 208.

As shown in FIG. 11, leg 230 includes a lowermost apertured tab 232. A series of threaded holes such as that designated by reference numeral 234 are provided along the length of base 182, and screw 236 extends through apertured tab 232 and engages hole 234 in order to secure leg 230 to base 182. Leg 230 includes an upper support tab 238 having at least one aperture 240 formed therein and overlying a corresponding threaded hole 242 formed within second side 210 of elongated surface 204. Screw 244 extends through hole 240 and threadedly engages hole 242 in order to support side portion 210.

Still referring to FIG. 11, upper support tab 238 of leg 230 can advantageously extend completely across slotted opening 212 and thereby serve the additional function of abutting at least one telephone jack supported within slotted opening 212 to inhibit sliding movement of the telephone jacks supported therein. In this manner, leg 230 may serve as a retaining member analogous to retaining member 40 described with reference to FIG. 1. A second hole 246 is formed within upper support tab 238 overlying a corresponding threaded hole 248 formed within first side portion 208 of elongated surface 204. Screw 250 is advanced through hole 246 and threadedly engaged with hole 248 to maintain upper support tab 238 perpendicular to slotted opening 212 and in abutting relationship with a telephone jack. Those skilled in the art will appreciate that legs 228 and 230 are applied only after insertion of the telephone jacks which are to be supported within slotted openings 196 and 212 between legs 228 and 230 and the upper end of elongated surfaces 190 and 204 in order to avoid interference with the insertion thereof.

As mentioned above, telephone jack support member 180 shown in FIGS. 11 and 12 is adapted to support a punch down terminal board upon the central portion thereof intermediate elongated surfaces 190 and 204, and hence, between the pluralities of telephone jacks supported therein. Within FIG. 11, dashed rectangle 252 designates the portion of base 182 covered by such a punch down terminal board. As shown in FIG. 12, terminal board 254 is provided with six wire gripping terminals 256–261 in each row. Terminals 256–258 are shorted to one another and are insulated from terminals 259–261, the latter of which are also shorted together. Terminals 256–258 may be used for wiring interconnections to telephone jacks and associated telephone plugs supported within the channel of elongated surface 190, while terminals 259–261 may be used for wiring interconnections to telephone jacks supported within the slotted opening 212 forming the channel within elongated surface 204.

As shown in FIG. 12, terminal board 254 rests upon base 182 of the jack support member. Terminal board 254 may be of the type commercially available from AT & T under model number 66B3-50, which terminal board has holes formed in the four corners thereof for permitting the terminal board to be screwed or otherwise fastened directly to a telephone interchange wiring panel. One of such holes is shown in dashed outline within FIG. 12 by reference number 262. Corresponding holes, such as those designated 264 and 266 within FIG. 11, are formed within base 182. Accordingly, a single screw or other fastener (not shown) may be simultaneously extended through hole 262 in terminal board 254, and through hole 264 in base 182, and threaded into the wiring panel therebehind in order to simultaneously secure terminal board 254 to base 182 and to secure base 182 to the wiring panel.

Those skilled in the art will appreciate that each of the telephone jack support members described above may be made from relatively thin sheets of steel or aluminum using conventional metal working stamping and bending procedures. Telephone jacks of the type referenced above are commercially available from American Telephone and Telegraph Company (formerly Western Electric) under various model designations, including Model WE 652A and No. WE 652D. Model No. WE 652A is supplied with side grooves approximately 0.1 inch wide, and accordingly, the metal stock in which the jack supporting channels are formed is selected to be approximately 0.1 inch thick. Model No. WE 652D is provided by the manufacturer with side grooves approximately 0.05 inch wide, and accordingly, the thickness of the metal stock from which jack supporting channels are formed to support this type of telephone jack is selected to be approximately, 0.05 inch thick.

Figures 15, 16, 17, 18, 19:
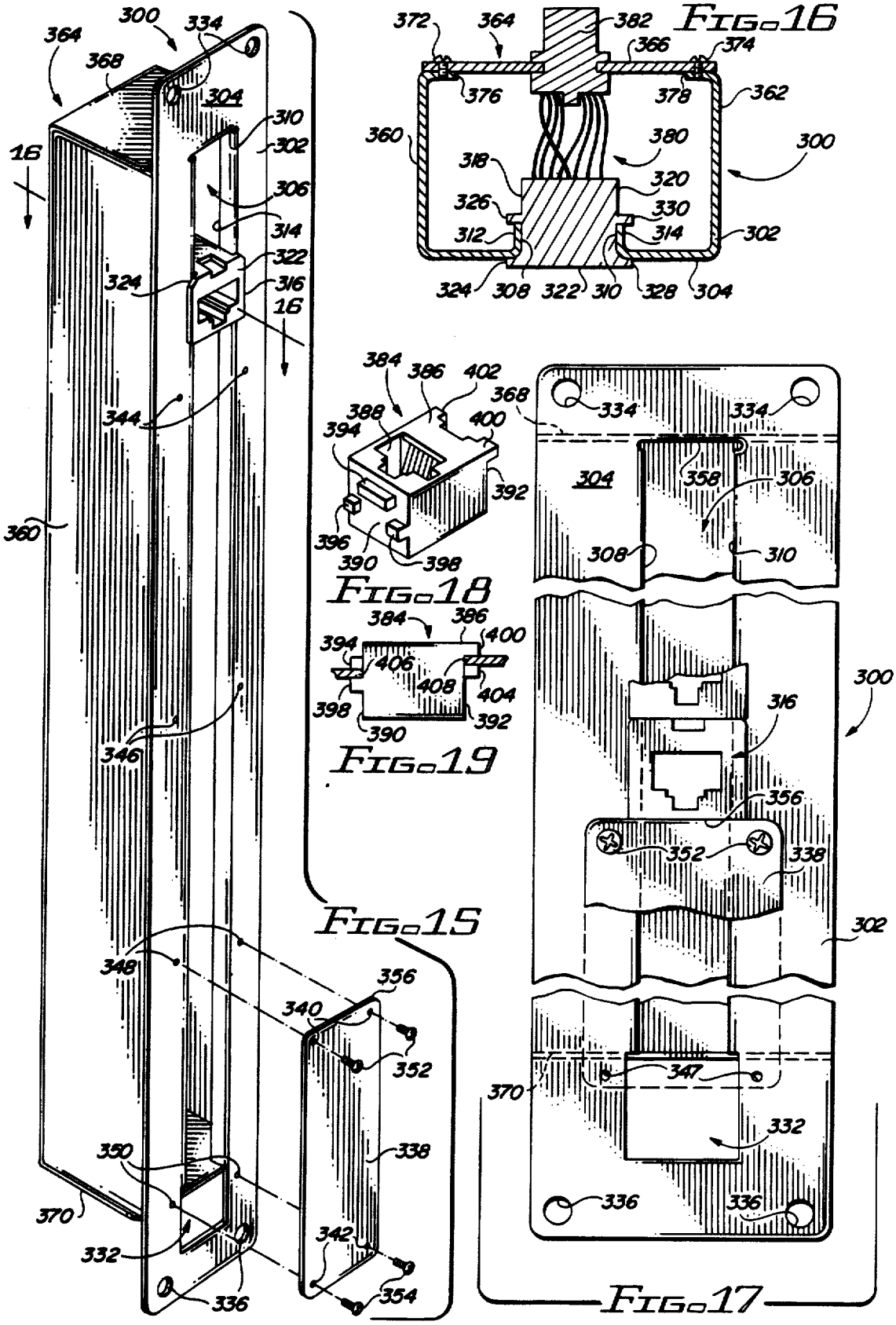
FIG. 15 is a perspective view of another embodiment of a multiple telephone jack slide assembly wherein the edge portions forming the channel in which the telephone jacks slide include a downwardly turned flange and wherein the slide assembly includes an AMP-type plug-in connector.
FIG. 16 is a cross-sectional view of the slide assembly shown in FIG. 15 taken through lines 16—16.
FIG. 17 is a top view of the slide assembly shown in FIG. 15 and illustrating the manner in which a retainer plate is used to secure a plurality of telephone jacks therein.
FIG. 18 is a perspective view of an alternate form of telephone jack that may be used in conjunction with the present invention.
FIG. 19 is a cross-sectional partial view of the slide assembly shown in FIG. 1 modified to support telephone jacks of the type shown in FIG. 18.

FIGS. 15, 16 and 17 illustrate an alternate embodiment of the present invention, the multiple telephone jack slide assembly shown therein being designated generally by reference numeral 300. Slide assembly 300 includes a sliding jack support member 302 which includes a generally planar elongated surface At least one longitudinal channel 306 is formed in jack support member 302, channel 306 forming a slotted opening in generally planar surface 304. Channel 306 is bounded by first and second generally opposing edge portions of support member 302. As shown in FIGS. 15 and 16, first and second opposing edge portions 308 and 310 are formed by a pair of downturned flanges 312 and 314, respectively, which extend generally perpendicular from planar surface 304 from opposing sides of channel 306.

As shown in FIGS. 15–17, telephone jack slide assembly 300 is adapted to support a plurality of telephone jacks to be electrically interconnected with a wiring system. Referring to FIG. 16 in particular, one common type of telephone jack, commercially available from AT&T/Western Electric under model No. 641F WE, includes a pair of side walls 318 and 320 which extend downwardly from and substantially perpendicular to the upper surface 322. Sidewall 318 includes an upper ridge or projection 324 which extends therefrom continuous with upper surface 322. A second ridge or projection 326 extends from the central portion of side wall 318 substantially parallel to projection 324. Similarly, upper projection 328 and lower projection 330 extend from side wall 320. Upper projection 324 and lower projection 326 are spaced apart from one another by a predetermined gap.

Jack support member 302 is adapted to slidingly support a plurality of telephone jacks 316. Opposing edge portions 308 and 310, corresonding to the inwardly directed faces of flanges 312 and 314, are separated by a predetermined distance generally corresponding to the width of longitudinal channel 306. This predetermined distance is designed to be commensurate with the width of telephone jack 316, i.e., the distance between side walls 318 and 320. Moreover, the width of flanges 312 and 314 is designed to be commensurate with the predetermined gap separating upper projection 324 and lower projection 326 for allowing telephone jack 316 to slide along channel 306 while being supported by opposing flanges 312 and 314. Thus, upper projections 324 and 328, and lower projections 312 and 330, constitute engagement means for slidingly engaging opposing edge portions 308 and 310 defining channel 306.

As shown in FIGS. 15 and 16, flanges 312 and 314 may be continuous with planar surface 304 and simply constitute right angle bends of the material making up planar surface 304 to form the aforementioned flanges. Those skilled in the art will appreciate that, while such flanges are shown and described as being downturned flanges, upturned flanges would serve equally as well. Furthermore, while flanges 312 and 314 are themselves shown as being primarily planar, flanges 312 and 314 may be curved or have other shapes, provided that such flanges have an overall face width commensurate with the predetermined gap separating upper projection 324 and lower projection 326.

Referring to FIGS. 15 and 17, an oversized opening 332 is formed within planar surface 304 communicating with channel 306, preferably at one end thereof. The purpose of opening 332 is to permit each of the plurality of telephone jacks 316 to be slidingly inserted into channel 306 so that the telephone jacks can be supported therein. Accordingly, the dimensions of opening 332 are slightly larger than the dimensions of upper surface 322 of telephone jack 316 to allow telephone jack 316 to be lowered into opening 332. Flanges 312 and 314 of support member 302 terminate prior to reaching opening 332 to avoid interferring with the insertion of telephone jack 316 therein.

As has already been noted, multiple telephone jack slide assemblies of the type described herein can be directly mounted to telephone interchange wiring panels. Alternatively, multiple telephone jack slide assemblies of the type described herein may also be mounted to other electrical wiring systems. For example, support member 302 shown in FIGS. 15 and 17 includes a first pair of mounting holes 334 and a second pair of mounting holes 336 located at the opposing ends thereof. These mounting holes are adapted to receive screws or other fasteners for mounting slide assembly 300 to an electronic equipment frame, such as a telephone wire interchange rack.

Once the plurality of telephone jacks 316 have been slid into channel 306 through opening 332, a retainer may be provided for inhibiting further sliding movement of the telephone jacks within channel 306. Referring to FIGS. 15 and 17, a retainer plate 338 is shown having a width somewhat larger than the width of channel 306. Retainer plate 338 may be generally rectangular and is provided with fastener-receiving holes 340 and 342 at its opposing ends. A series of threaded holes 344, 346, 348, and 350 are provided at spaced intervals along support member 302 on opposing sides of slot 306. A pair of screws 352 are provided for passing through holes 340 and threadedly engaging holes 348. Similarly, screws 354 pass through holes 342 and threadedly engage holes 350, in order to releasably fasten retaining plate 338 to support member 302. As shown in FIG. 17, edge 356 abuts the telephone jack 316 located closest to opening 332 for clamping the plurality of telephone jacks 316 between edge 356 of retainer plate 338 and upper edge 358 of slot 306.

Those skilled in the art will appreciate that retainer plates of various lengths may be provided for releasably securing different numbers of telephone jacks 316 within slot 306. For example, the length of the retainer plate 338 shown in FIG. 15 may be doubled, in which case fastening screws 352 may be engaged with threaded holes 346 in support member 302.

Support member 302 shown in FIGS. 15–17 advantageously includes sidewalls 360 and 362 which extend generally perpendicular to planar surface 304 from opposing sides thereof. As shown in FIG. 15, sidewalls 360 and 362 terminate short of the ends of planar surface 304 to avoid interferring with the mounting of slide assembly 300 to an electronic equipment frame. Sidewalls 360 and 362 may be continuous with planar surface 304; for example, if support member 302 is formed of sheet metal, side walls 360 and 362 may simply constitute right angle bends of such sheet material relative to planar surface 304.

As further shown in FIGS. 15 and 16, slide assembly 300 preferably includes a rear enclosure member 364 including a back panel 366 and a pair of opposing end panels 368 and 370 extending generally perpendicular from rear panel 366. Rear panel 366 has a length slightly greater than the length of side walls 360 and 362; end panels 368 and 370 each have a length commensurate with the width of side walls 360 and 362. In this manner, enclosure member 364 serves to mate with support member 302 and enclose the interior portion thereof. As shown in FIG. 16, rear panel 366 may be secured by screws 372 and 374 through threaded holes formed in right-angle extensions 376 and 378, respectively, of side walls 360 and 362 for releasably fastening enclosure member 364 to support member 302.

As shown in FIG. 16, telephone jacks 316 include a plurality of connecting wires, designated generally by reference numeral 380 extending therefrom. In one preferred embodiment of the present invention, slot 306 is made of such a length as to accept up to 23 of such telephone jacks for electrical interconnection with a fifty pin AMP connector 382 in order to provide a convenient means for making electrical interconnection between slide assembly 300 and the electronic equipment frame to which it is attached. If all 23 telephone jacks are inserted into channel 306, then retainer plate 338 may be omitted. In this event, end panel 370 of enclosure member 364 serves as a retainer. End panel 370 extends generally perpendicular to planar surface 304 and is disposed proximate to opening 332 at the point where it joins panel 306. Accordingly, end panel 370 abuts the last of the 23 telephone jacks and prevents the same from sliding; from channel 306 into opening 332. Consequently, enclosure member 364 is secured to support member 302 after the telephone jacks are slid into channel 306.

FIG. 18 illustrates yet another form of telephone jack which may be used in conjunction with the slide assembly of the present invention. Telephone jack 384 includes an upper surface 386 opening into a cavity 388. A first sidewall 390 extends downwardly from upper surface 386 substantially perpendicular thereto. A second sidewall 392 (see FIG. 19) extends downwardly from the opposite side of upper surface 386 substantially perpendicular thereto.

Sidewall 390 of telephone jack 384 has an upper projection 394 extending thereform substantially parallel to upper surface 386. A pair of lower projections 396 and 398 also extend from sidewall 390 below projection 394 and on opposing sides thereof. As shown in FIG. 19, projections 396 and 398 are spaced below projection 394 by a predetermined distance or gap. This gap defines a first engagement path which may be used to slidingly support sidewall 390 of telephone jack 384.

With respect to side wall 392, a pair of upper projections 400 and 402 extend from side wall 392, the uppermost portions of projections 400 and 402 being continuous with upper surface 386. A lower projection 404 also extends from sidewall 392 below and centered between projections 400 and 402 and parallel to upper surface 386. As shown in FIG. 19, lower projection 404 is spaced apart from upper projections 400 and 402 by the same predetermined distance or gap described above in relation to sidewall 390. This gap between upper projections 400 and 402 and lower projection 404 defines a second engagement path which may be used to slidingly support side wall 392.

Referring again to FIG. 19, it will be noted that the first engagement path formed on sidewall 390 and the second engagement path formed upon sidewall 392 are at different distances from upper surface 386, and hence, that a predetermined offset exists between the first engagement path and the second engagement path relative to upper surface 386. Telephone jacks of the type shown in FIGS. 18 and 19 are commercially available from AT&T/Western Electric under Model No. 647B WE.

Referring briefly to FIGS. 4 and 5, it will be appreciated that telephone jacks of the type shown in FIGS. 18 and 19 are not easily supported within a support member of the type shown in FIGS. 4 and 5 due to the lateral offset between the first engagement path of side wall 390 and the second engagement path of side-wall 392. Accordingly, in order to better support telephone jacks of the type shown in FIGS. 18 and 19, the opposing edge portions 406 and 408 of the support members shown in FIG. 19 are laterally offset from one another by the same offset that exists between the aforementioned first and second engagement paths. In this manner, edge portion 406 of the support member is slidingly engaged by upper projection 394 and lower projections 396 and 398 for sliding within the first engagement path, while edge portion 408 of the support member is engaged by upper projections 400 and 402 and lower projection 404 for sliding within the second engagement path. Clearly, edge portions 406 and 408 of the support member shown in FIG. 19 lie in different planes, and accordingly, the portion of the support member used to form the channel in which the telephone jacks are slidingly supported is not a substantially planar member. The offset between edge portions 406 and 408 of the support member can be produced by appropriately bending the support member along the longitudinal axis of the channel formed therein in a manner known to those skilled in the art.

Referring again briefly to FIGS. 1 and 8, it has previously been mentioned that the lower support flange 100 of support member 22 may include doubled-over ears, like those designated by reference numerals 114 and 116, for being engaged by latch fingers 130–133 of a plastic mounting bracket. Those skilled in the art will appreciate that support member 22 can be mounted to a wide variety of electrical wiring systems. For example, connecting blocks are commonly used to make wiring interconnections for telephone systems. One example of such a connecting block is model No. 110DW1-100 commercially available from AT&T/Western Electric. Such connecting blocks are often provided with pegs or short support arms extending above the main body of the connecting block in order to releasably engage covers designed to extend over the connecting blocks. Those skilled in the art will appreciate that the aforementioned doubled-over ears of the multiple telephone jack support member can engage the short support arm of such connecting blocks, in lieu of the covers normally used with such connecting blocks, in order to releasably secure the support member to the top of the connecting block.

It will now be appreciated that a multiple telephone jack slide assembly has been described which conveniently supports a plurality of telephone jacks upon an electrical wiring system. While the invention has been described with reference to preferred embodiments thereof, the description is for illustrative purposes only and is not to be construed as limiting the scope of the invention. Various other modifications and changes may be made by those skilled in the art without departing from the true spirit and scope of the invention as defined by the appended claims.

I claim:

1. A multiple telephone jack slide assembly for supporting a plurality of telephone jacks to be electrically interconnected with a wiring system, said assembly including:

(a) a sliding jack support member having at least one longitudinal channel formed therein, said channel being defined by first and second generally opposing edge portions of said support member, said first and second generally opposing edge portions being separated by a predetermined distance generally corresponding to the width of said channel, said channel having an opening communicating therewith for permitting a telephone jack to be inserted into said channel;

(b) a plurality of telephone jacks each having an upper surface opening into a cavity for releasably receiving a mating telephone cord plug, each of said telephone jacks further including a pair of opposing side walls extending downwardly, from said upper surface and substantially perpendicular thereto, said opposing side walls being separated by a distance approximating the width of said channel, said opposing side walls including engaging means for slidingly engaging said first and second generally opposing edge portions of said channel for permitting each of said plurality of telephone jacks to be slid into said channel from the opening thereof in order to support said plurality of telephone jacks within said channel; and (c) retaining means releasably fastened to said support member and abutting at least one of said plurality of telephone jacks for inhibiting further sliding movement of said plurality of telephone jacks after the same are slid into said channel.

2. The assembly recited by claim 1 wherein said support member includes a generally planar elongated surface, said [hanhel] *channel* forming a slotted opening in said generally planar surface, said first and second generally opposing edge portions comprising the portions of said generally planar elongated surface disposed adjacent the slotted opening therein, said generally [Planar] *planar* elongated surface having a predetermined thickness, and wherein said engaging means comprises first and second grooves formed within the opposing side walls, respectively, of each of said telephone jacks, the width of said first and second grooves being commensurate with the thickness of said generally planar elongated surface, the distance separating said opposing side walls being slightly in excess of the width of said channel, said first and second grooves being adapted to slidingly receive said first and second generally opposing edge portions of said channel, respectively, for supporting each of said telephone jacks in sliding engagement with said support member.

3. The assembly recited by claim 1 wherein said support member has at least first and second apertures formed therein adjacent said first and second opposing edge portions, and wherein said retaining means comprises a retaining member having corresponding apertures formed therein and fastening means extending through the corresponding apertures of said retaining member and said support member for fastening said retaining member to said support member across said channel in abutting relationship with at least one of said plurality of telephone jacks.

4. The assembly recited by claim 1 wherein:

(a) said engaging means included within said opposing side walls of each of said plurality of telphone jacks comprises a first engagement means disposed upon a first of said opposing side walls and a second engagement means disposed upon a second of said opposing side walls, said first engagement means defining a first engagement path lying a first distance from the upper surface of each said telephone jack, said second engagement means defining a second engagement path lying a second distance from the upper surface of each said telephone jack, and wherein the second distance differs from the first distance by a predetermined offset; and (b) said first and second generally opposing edge portions of said support member being laterally offset from one another by said predetermined offset for permitting said first edge portion to slide within the first engagement path and for permitting said second edge portion to slide within the second engagement path.

5. The assembly recited by claim 1 wherein:

(a) said engaging means included within said opposing side walls of each of said plurality of telephone jacks comprises first and second projections extending from each of said opposing side walls, said first and second projections being spaced apart from one another by a predetermined gap; and (b) said first and second generally opposing edge portions each having a face width commensurate with said predetermined gap for slidingly engaging said first and second projections.

6. The assembly recited by claim 5 wherein said support member includes a generally planar elongated surface, said channel forming a slotted opening in said generally planar surface, said support member including a pair of flanges extending generally perpendicular to said generally planar elongated surface and extending from opposing sides of said slotted opening, said flanges each having a width commensurate with said [predeter-] *predetermined* gap, said pair of flanges comprising said first and second generally opposing edge portions of said support member.

7. The assembly recited by claim 1 wherein said support member includes means for fastening said support member to an electronic equipment frame.

8. The assembly recited by claim 1 wherein said support member includes a generally planar elongated surface, said channel forming a slotted opening in said generally planar surface, said plurality of telephone jacks each having connecting wires extending therefrom, said assembly further including an enclosure member releasably fastened to said support member to enclose and protect said connecting wires.

9. The assembly recited in claim 8 wherein said enclosure member includes at least one panel disposed generally perpendicular to said generally planar elongated surface and disposed [proxiate ] *proximate* to said opening of said channel for preventing telephone jacks within said channel from sliding into said opening.

10. A multiple telephone jack slide assembly for supporting a plurality of telephone jacks to be electrically interconnected with a wiring system, each of the plurality of telephone jacks having an upper surface opening into a cavity for releasably receiving a mating telephone cord plug, each of the telephone jacks further including a pair of opposing side walls extending downwardly from the upper surface thereof and substantially perpendicular thereto, the opposing side walls being separated by a distance corresponding to the width of the telephone jack, the opposing side walls including engagements adapted to aid in supporting each telephone jack, said slide assembly comprising in combination:

(a) a sliding jack support member having at least one longitudinal channel formed therein, said channel being defined by first and second generally opposing edge portions of said support member, said first and second generally opposing edge portions being separated by a predetermined distance generally corresponding to the width of said channel and commensurate with the width of said telephone jacks, said channel having an opening communicating therewith for permitting a telephone jack to be inserted into said channel, said first and second generally opposing edge portions being adapted to slidingly engage the engagements included within the opposing side walls of each telephone jack for permitting each of the plurality of telephone jacks to be slid into said channel from said opening thereof;

(b) fastening means for fastening said support member to said wiring system; and (c) retaining means releasably fastened to said support member and adapted to abut at least one of the plurality of telephone jacks for inhibiting further sliding movement of the plurality of telephone jacks after the same are slid into said channel.

*11. A multiple telephone jack slide assembly for supporting a plurality of telephone jacks to be electrically interconnected with a wiring system, said assembly including:*

*(a) a sliding jack support member having at least one longitudinal channel formed therein, said channel being defined by first and second generally opposing edge portions of said support member, said first and second generally opposing edge portions being separated by a predetermined distance generally corresponding to the width of said channel, said channel having an opening communicating therewith for permitting a telephone jack to be inserted into said channel;*

*(b) a plurality of telephone jacks each having an upper surface opening into a cavity for releasably receiving a mating telephone cord plug, each of said telephone jacks further including a pair of opposing side walls extending downwardly from said upper surface and substantially perpendicular thereto, said opposing side walls being separated by a distance approximating the width of said channel, said opposing side walls including engaging means for slidingly engaging said first and second generally opposing edge portions of said channel for permitting each of said plurality of telephone jacks to be slid into said channel from the opening thereof in order to support said plurality of telephone jacks within said channel; and*

*(c) retaining means secured to said support member and abutting at least one of said plurality of telephone jacks for inhibiting further sliding movement of said plurality of telephone jacks after the same are slid into said channel.*

*12. The assembly recited by claim 11 wherein said support member includes a generally planar elongated surface, said channel forming a slotted opening in said generally planar surface, said first and second generally opposing edge portions comprising the portions of said generally planar elongated surface disposed adjacent the slotted opening therein, said generally planar elongated surface having a predetermined thickness, and wherein said engaging means comprises first and second grooves formed within the opposing side walls, respectively, of each of said telephone jacks, the width of said first and second grooves being commensurate with the thickness of said generally planar elongated surface, the distance separating said opposing side walls being slightly in excess of the width of said channel, said first and second grooves being adapted to slidingly receive said first and second generally opposing edge portions of said channel, respectively, for supporting each of said telephone jacks in sliding engagement with said support member.*

*13. The assembly recited by claim 11 wherein said support member has at least first and second apertures formed therein adjacent said first and second opposing edge portions, and wherein said retaining means comprises a retaining member having corresponding apertures formed therein and fastening means extending through the corresponding apertures of said retaining member and said support member for fastening said retaining member to said support member across said channel in abutting relationship with at least one of said plurality of telephone jacks.*

*14. The assembly recited by claim 11 wherein:*

*(a) said engaging means included within said opposing side walls of each of said plurality of telephone jacks comprises a first engagement means disposed upon a first of said opposing side walls and a second engagement means disposed upon a second of said opposing side walls, said first engagement means defining a first engagement path lying a first distance from the upper surface of each said telephone jack, said second engagement means defining a second engagement path lying a second distance from the upper surface of each said telephone jack, and wherein the second distance differs from the first distance by a predetermined offset; and*

*(b) said first and second generally opposing edge portions of said support member being laterally offset from one another by said predetermined offset for permitting said first edge portion to slide within the first engagement path and for permitting said second edge portion to slide within the second engagement path.*

*15. The assembly recited by claim 11 wherein:*

*(a) said engaging means included within said opposing side walls of each of said plurality of telephone jacks comprises first and second projections extending from each of said opposing side walls, said first and second projections being spaced apart from one another by a predetermined gap; and*

*(b) said first and second generally opposing edge portions each having a face width commensurate with said predetermined gap for slidingly engaging said first and second projections.*

*16. The assembly recited by claim 15 wherein said support member includes a generally planar elongated surface, said channel forming a slotted opening in said generally planar surface, said support member including a pair of flanges extending generally perpendicular to said generally planar elongated surface and extending from opposing sides of said slotted opening, said flanges each having a width commensurate with said predetermined gap, said pair of flanges comprising said first and second generally opposing edge portions of said support member.*

*17. The assembly recited by claim 11 wherein said support member includes means for fastening said support member to an electronic equipment frame.*

*18. The assembly recited by claim 11 wherein said support member includes a generally planar elongated surface, said channel forming a slotted opening in said generally planar surface, said plurality of telephone jacks each having connecting wires extending therefrom, said assembly further including an enclosure member releasably fastened to said support member to enclose and protect said connecting wires.*

*19. The assembly recited by claim 18 wherein said enclosure member includes at least one panel disposed generally perpendicular to said generally planar elongated surface*

*and disposed proximate to said opening of said channel for preventing telephone jacks within said channel from sliding into said opening.*

*20. A multiple telephone jack slide assembly for supporting a plurality of telephone jacks to be electrically interconnected with a wiring system, each of the plurality of telephone jacks having an upper surface opening into a cavity for releasably receiving a mating telephone cord plug, each of the telephone jacks further including a pair of opposing side walls extending downwardly from the upper surface thereof and substantially perpendicular thereto, the opposing side walls being separated by a distance corresponding to the width of the telephone jack, the opposing side walls including engagements adapted to aid in supporting each telephone jack, said slide assembly comprising in combination:*

*(a) a sliding jack support member having at least one longitudinal channel formed therein, said channel being defined by first and second generally opposing edge portions of said support member, said first and second generally opposing edge portions being separated by a predetermined distance generally corresponding to the width of said channel and commensurate with the width of said telephone jacks, said channel having an opening communicating therewith for permitting a telephone jack to be inserted into said channel, said first and second generally opposing edge portions being adapted to slidingly engage the engagements included within the opposing side walls of each telephone jack for permitting each of the plurality of telephone jacks to be slid into said channel from said opening thereof;*

*(b) fastening means for fastening said support member to said wiring system; and*

*(c) retaining means secured to said support member and adapted to abut at least one of the plurality of telephone jacks for inhibiting further sliding movement of the plurality of telephone jacks after the same are slid into said channel.*

* * * * *